Feb. 23, 1960 J. S. DOWNS ET AL 2,925,994
SEAT FOR GATE VALVE
Filed Feb. 11, 1954
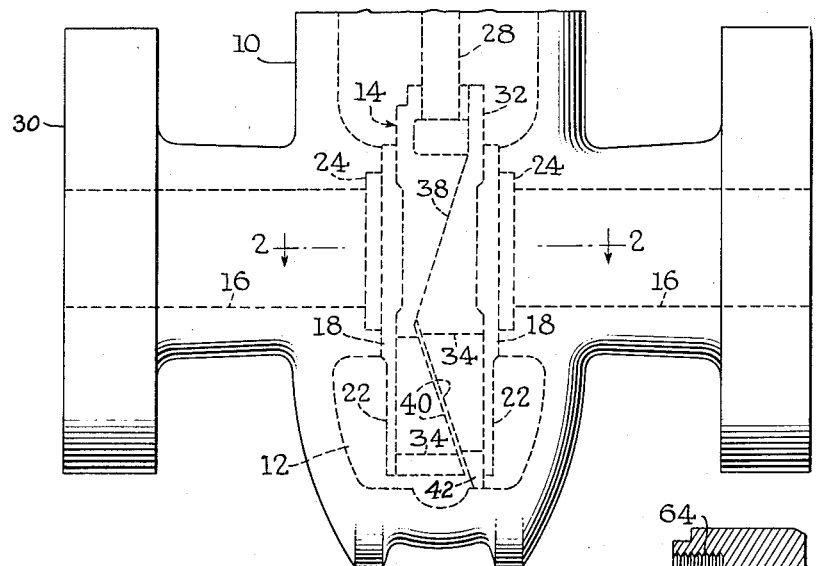
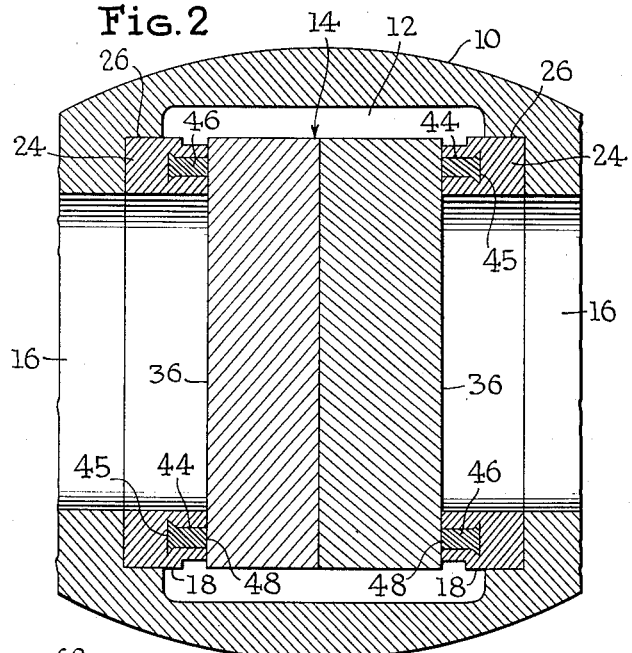
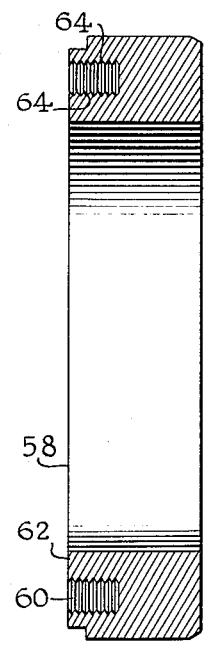
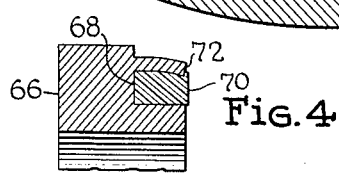
INVENTORS
Jesse S. Downs
and Collier C. Pryor
BY Leo B. Kenon
ATTORNEY.

United States Patent Office 2,925,994
Patented Feb. 23, 1960

2,925,994

SEAT FOR GATE VALVE

Jesse S. Downs and Collier C. Pryor, Houston, Tex., assignors, by mesne assignments, to ACF Industries, Incorporated, a corporation of New Jersey Application February 11, 1954, Serial No. 409,676

2 Claims. (Cl. 251—360)

This invention relates to gate valves, and more particularly to an improved gate valve for controlling the flow of fluids under relatively high pressures without the use of gate lubricants and free from pressure-lock problems. This application is a continuation-in-part of our application Serial Number 290,302, filed May 27, 1952, now abandoned, which has been replaced by S.N. 630,791, filed December 27, 1956.

The invention will be described with reference to gate valves, especially to a two-part gate type of valve, and even more especially to through-conduit gates valves having a forcibly expansible gate. By through-conduit gate valve is meant a valve which, when opened, presents an unbroken smooth-walled conduit for the uninterrupted passage of fluid therethrough.

Because of the nature of their construction and of the sliding or wiping contact between their sealing surfaces, gates valves are subject to several practical operating difficulties. In particular, the sealing surfaces of gate valves, especially those adapted to control fluids under relatively high pressure and/or various types of chemicals, some of which may be corrosive, frequently are supplied with thick viscous grease not only for lubricating purposes, but also for sealing purposes. A film of such grease between valve sealing surfaces fills minute crevices and imperfections therein and enables a valve to operate under much higher pressures without appreciable leakage. The necessity of lubricating gate valves increases not only their manufacturing expense, but also their maintenance expense by requiring replenishment of the lubricant from time to time. Additionally, in certain types of lubricated gate valves, there may be leakage of the lubricant into the fluid passed through the valve, thereby contaminating the fluids and adding to the expense of practical operation of the valve.

Gate valves, particularly of the larger sizes, require considerable force to move the gate under high pressure, since the pressure in the upstream side of the line presses the gate tightly against the downstream valve seat. Two-part gate valves, i.e. having a two-piece valve gate each having a sealing surface cooperating with one of the valve seats, are subject to a further operating difficulty known as a pressure-lock condition. This condition occurs when the valve is closed under high pressure and the pressure on both sides of the line is subsequently lowered, or, conversely, the pressure within the valve housing rises above that on both sides of the line. This latter situation may occur upon a temperature rise with consequent expansion of the fluid trapped within the valve housing. Under a pressure-lock condition, both members of the valve gate are urged apart and held tightly against their respective valve seats by the pressure differential between the valve chamber and both sides of the line. Obviously, the force then required to slide the valve gate against the seats in order to open the valve is increased over the force normally required to open the valve. Sometimes the pressure differential is sufficiently great to bind the valve gate so tightly that it is substantially impossible to open the valve except by power-operated mechanisms. The causes and effects of a pressure-lock condition are described more fully in the U.S. patents issued in the name of Milton P. Laurent, Nos. 2,479,124 and 2,583,512.

As described in the first-mentioned patent, springs may be incorporated in the valve gate to pull the two parts together upon their initial opening movement in an attempt to avoid the consequences of a pressure-lock condition. Such springs obviously increase the cost of a gate valve. It also will be seen that the use of lubricant between the sealing surfaces of the gate and its seats is an atempt to avoid the consequences of a pressure-lock condition, by reducing the sliding friction between such surfaces.

Hence, it is an object of this invention to provide a gate valve which eliminates the necessity of lubricating the sealing surfaces of the valve.

It is another object of this invention to provide an improved valve seat for a gate valve which reduces the sliding friction between the gate and the seat to such an extent that the force required to open or close the valve is reduced to a minimum, in fact this force reduction is so great that the valve may readily be opened without undue effort, even under a pressure-lock condition.

It is another object of this invention to provide a gate valve which will seat so tightly that, even without lubricant on the sealing surfaces, the valve will hold extremely volatile fluids under high pressure without leakage.

It is a further object of this invention to provide a valve sealing surface of a material which will accomplish the foregoing objects.

It is a still further object of this invention to provide valve seat rings shaped to securely retain seal materials properly positioned.

Other objects and advantages of the invention will be apparent from the following specification and accompanying drawings in which:

Figure 1 is a fragmentary elevational view of a gate valve embodying this invention. The valve is shown in closed position with the valve gate assembly expanded into sealing engagement with the valve seats, Figure 2 is a fragmentary sectional view through the valve taken substantially on the line 2—2 of Figure 1, Figure 3 is a sectional view of a modified form of the valve seat somewhat enlarged from that shown in Figure 2 and omitting the sealing ring of synthetic resin material, and Figure 4 is a fragmentary sectional view of a further modified form of valve seat.

Referring now to the drawings, there is shown in Figures 1 and 2 a through-conduit gate valve having a housing 10 providing an interior valve chamber 12 in which is housed the gate mechanism 14 of the valve. Aligned ports 16 in opposite walls of the housing 10 are provided, at their inner ends, with opposed flat-faced valve seats 18, each having a depending skirt 22, and between which the gate mechanism 14 of the valve is confined and guided for substantially rectilinear movement. The seats 18 preferably are constructed as removable inserts having annular hubs 24 which have a pressed fit in counter-bores 26 at the inner ends of the ports 16. The upper portion of the housing 10 is of known construction, having a bonnet (not shown) through which extends a valve operating stem 28 for raising and lowering the gate mechanism 14 to open and close the valve.

The ported valve gate mechanism 14, which slides between the seats 18, is formed in two sections, one herein termed the gate 30 and the other the segment 32. Both sections have ports 34 which in the open position of the valve are aligned with the housing ports 16 to form a smooth-walled unbroken passageway for unobstructed flow of fluid through the valve. The valve stem 28 is connected to the gate 30, rectilinear movement of which by the stem 28 carries the segment 32 along as a unit, as later described.

The gate 30 and segment 32, when assembled, are substantially rectangular in transverse section, i.e. as shown in Figure 2, so that their flat outer faces 36, normally of highly polished metal are disposed parallel and opposed to the corresponding flat-faced metal valve seats 18 for sealing engagement therewith.

The inner opposed faces of the gate 30 and the segment 32 are formed with two complementary, angularly related surface portions that diverge from the midportions of the gate and the segment to form two sets 38 and 40 of mutually wedging surfaces. When both sets 38 and 40 of these wedging surfaces are in contact, i.e. the gate 30 and segment 32 are mated, the transverse dimension of the gate assembly 14 is slightly less than the distance between the valve seats 18. Hence, when the gate assembly 14 is thus contracted, sufficient clearance exists between the assembly and the valve seats 18 to enable the assembly to be moved freely and easily by the valve stem 28. Relative endwise displacement, however, of the gate 30 and the segment 32 from their mated position, in either direction along the line of travel of the assembly 14, results in a mutual wedging action between one of the two sets 38 and 40 of the wedging surfaces. This wedging action is effective to expand the assembly 14 transversely and force the outer sealing faces 36 of the gate 30 and of the segment 32 into tight sealing engagement with their respective valve seats 18. Such relative endwise displacement is imparted to the gate 30 and to the segment 32 adjacent both ends of travel of the assembly 14 by interior abutments 42 (only one of which is shown) in the housing 10. These abutments 42 are engaged by the corresponding ends of the segment 32 and arrest the travel thereof before the gate 30, impelled by the valve stem 28, reaches its final limit of travel. Hence, the gate assembly 14 is expanded into tight sealing engagement with the valve seats 18 in both the open and closed positions of the valve.

Each of the valve seats 18 may be provided with an annular recess 44, somewhat rectangular in radial section, surrounding the corresponding port. As shown in Figure 2, the recesses 44 have an enlarged bottom portion 45. Mounted in each of these recesses 44, is a ring 46, completely filling the recess and being of slightly greater axial thickness than the depth of the recesses, so that the ring 46 projects slightly therefrom when not compressed into the recess. The outer flat annular surface 48 of each ring 46 presents an endless sealing and wiping surface to the opposed metallic face 36 of the gate assembly 14, which surface surrounds the corresponding port 16.

The ring 46 is preferably molded or pressed into the recess 44 so as to fill the enlarged bottom portion 45 and thereby lock the ring in the recess. The modified form of valve seat ring 58 illustrated in Figure 3 provides an annular recess 60 in the face 62 of the ring. The side walls of the recess 60 are grooved or knurled as shown by the numeral 64, in order to provide a rough surface for holding a sealing ring molded or pressed into the recess 60. The valve seat ring 58 is shown without the sealing ring in the recess 60, and it should be understood that the recess is to be completely filled by molding or pressing plastic sealing material into the recess and into the grooved side wall surface. A further modified form for holding the sealing material in the valve seat ring is illustrated in Figure 4, wherein the valve seat ring 66 is provided with an annular recess 68 containing a ring 70 of sealing material. The outer metal wall 72 of the ring 66 is rolled slightly inward after the material 70 is in place in order to grip the material and prevent the sealing material 70 from working out of the recess 68. The three forms of sealing material recesses illustrated have been found particularly suitable for retaining in proper position sealing material of the composition hereinafter described.

The rings 46 and 70 are preferably formed of a synthetic resin material which is a polymer of tetrafluoroethylene. One suitable resin is known by the trade name "Teflon" and is supplied by E. I. du Pont de Nemours & Co., Inc. The physical properties of this resin include, among others, the following:

| | |
|---|---|
| Specific gravity | 2.1–2.3. |
| Tensile strength | 2000–4500 lbs. per sq. in. |
| Hardness | 55 D. durometer. |
| Coefficient of expansion | $5.5 \times 10^{-5}$ per ° F. |
| Moisture permeability | 0.00–0.5 gram per square meter per 24 hours. |

In addition to the above physical properties, and insofar as is now known, this polymer of tetrafluoroethylene is substantially inert to all chemicals except molten alkali metals. Said material has an extremely low coefficient of friction, in fact the coefficient of friction is so low that the material feels somewhat soapy to the touch.

Although the above-listed physical properties of said polymer are available, this material produces unexpected and unusual results when employed to form the sealing and wiping surface of a gate valve seat for engagement by a slidable metallic valve member. It has been found in actual practice that when the sealing surface of the downstream seat of a gate valve includes said polymer of tetrafluoroethylene, the valve will hold fluids under high pressure without leakage. Prior to the instant invention, this could be accomplished only by augmenting the valve seal by the employment of a thick viscous grease or lubricant on the sealing surfaces. Hence, because of this unexpected property of this polymer of tetrafluoroethylene, the lubrication of the sealing surfaces of gate valves is unnecessary, and possible contamination of such fluids is eliminated. It has been found that the use of said material in gate valves provides effective sealing under much higher fluid pressures than heretofore possible with any known valve constructions. It has also been found that the use of said material in gate valves also provides for an effective wiping action for maintaining the surfaces of the gate members clean.

Additionally, because of the extremely low coefficient of friction of this polymer of tetrafluoroethylene, it has also been found in actual practice that when it is used as a sealing and wiping surface of a gate valve seat, the force required to open or close the gate valve against high pressure is reduced to a surprising extent. In fact, even under a pressure-lock condition it has been found to be possible to open a two-part gate valve of large size by hand, without appreciable exertion. This overcoming of a pressure-lock condition by the use of such a resin is possible even with unlubricated sealing surfaces and without the usual springs in the gate assembly which heretofore have been necessary to successively overcome pressure-lock.

In addition to the above novel results flowing from the use of a polymer of tetrafluoroethylene to form a sealing surface of a gate valve seat, the extremely low coefficient of expansion of the material enables gate valves to control high temperature fluids without leakage. Further, the inertness of the material to almost all chemicals renders it extremely useful in valves used to control chemical fluids. Additionally, the material wears well and will last in service about as long as the usual metallic seat sealing surface.

It thus will be seen that the objects of this invention have been fully and effectively achieved. It will be realized, however, that the specific embodiment used to illustrate the principles of this invention is susceptible to changes without departure from such principles. Therefore, this invention includes all modifications encompassed by the spirit and scope of the following claims.

What is claimed is:
1. A valve seat member, for a valve having passageways terminating in a valve member chamber, having a passage aligned with the passageway of the valve and an annular portion adapted to be positioned in a counterbore of the passageway, said seat member having a face portion provided with an annular recess, said recess having spaced coaxial side walls and a bottom wall, the side walls of said recess provided with screw thread type groove serrations, and a plastic annular member formed of tetrafluoroethylene positioned in said recess and projecting outward from the face portion of said seat member, said annular member prior to positioning in said recess having straight side walls and after positioning the side walls of said annular member being engaged with and conforming to the configuration of the screw thread type groove serrations and being retained in said groove by the said screw thread type groove serrations.

2. A valve seat member, for a valve having passageways terminating in a valve member chamber, having a passage aligned with the passageway of the valve and an annular portion adapted to be positioned in a counterbore of the passageway, said seat member having a face portion provided with an annular recess, said recess having spaced coaxial side walls and a bottom wall, the side walls of said recess provided with screw thread type groove serrations, and a plastic annular member formed of tetrafluoroethylene molded into said recess and projecting outward from the face portion of said seat member, the side walls of said annular member being engaged with and conforming to the configuration of the screw thread type groove serrations and being retained in said groove by the said screw thread type groove serrations.

References Cited in the file of this patent
UNITED STATES PATENTS

| | | |
|---|---|---|
| 257,634 | Arthur | May 9, 1882 |
| 1,424,094 | Gunn | July 25, 1922 |
| 2,104,419 | Frye | Jan. 4, 1938 |
| 2,348,548 | Koehler | May 9, 1944 |
| 2,401,377 | Smith | June 4, 1946 |
| 2,479,124 | Laurent | Aug. 16, 1949 |
| 2,622,840 | Cooke | Dec. 23, 1952 |
| 2,636,713 | Hamer | Apr. 28, 1953 |
| 2,641,278 | Eplett | June 9, 1953 |
| 2,701,119 | Smith | Feb. 1, 1955 |
| 2,707,483 | Shafer | May 3, 1955 |
| 2,776,813 | Blackman | Jan. 8, 1957 |
| 2,782,801 | Ludwig | Feb. 26, 1957 |

FOREIGN PATENTS

| | | |
|---|---|---|
| 324,654 | Germany | of 1920 |

OTHER REFERENCES

Chemical Age, pp. 10–14 inclusive, Jan. 1, 1949 (TP–1–C36), published by Benn Brothers, Ltd. (251–368). (Copy in Scientific Library and Div. 39.)